US011050532B2

(12) United States Patent
Jia et al.

(10) Patent No.: US 11,050,532 B2
(45) Date of Patent: Jun. 29, 2021

(54) METHOD AND SYSTEM FOR NON-ORTHOGONAL MULTIPLE ACCESS COMMUNICATION

(71) Applicants: Ming Jia, Ottawa (CA); Jianglei Ma, Ottawa (CA); Alireza Bayesteh, Ottawa (CA); Sanjeewa Herath, Ottawa (CA)

(72) Inventors: Ming Jia, Ottawa (CA); Jianglei Ma, Ottawa (CA); Alireza Bayesteh, Ottawa (CA); Sanjeewa Herath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 16/369,023

(22) Filed: Mar. 29, 2019

(65) Prior Publication Data

US 2019/0312694 A1 Oct. 10, 2019

Related U.S. Application Data

(60) Provisional application No. 62/654,075, filed on Apr. 6, 2018.

(51) Int. Cl.
*H04L 5/00* (2006.01)
*H04L 27/26* (2006.01)
*H04L 1/00* (2006.01)

(52) U.S. Cl.
CPC .......... *H04L 5/0046* (2013.01); *H04L 1/003* (2013.01); *H04L 5/0016* (2013.01); *H04L 27/2643* (2013.01)

(58) Field of Classification Search
CPC ..... H04L 27/362; H04L 5/0016; H04L 1/003; H04L 27/2643; H04W 72/042
See application file for complete search history.

(56) References Cited

U.S. PATENT DOCUMENTS

| 2010/0232542 | A1* | 9/2010 | Miyoshi | H04L 1/04 375/295 |
| 2013/0215942 | A1 | 8/2013 | Addepalli et al. | |

(Continued)

FOREIGN PATENT DOCUMENTS

| CN | 101346918 A | 1/2009 |
| CN | 105471543 A | 4/2016 |

(Continued)

OTHER PUBLICATIONS

Hosein Nikopour, et al. "Sparse Code Multiple Access", 2013 IEEE 24th International Symposium on Personal, Indoor and Mobile Radio Communications: Fundamentals and PHY Track.

(Continued)

*Primary Examiner* — Shukri Taha

(57) ABSTRACT

A bit-level operation may be implemented prior to modulation and resource element (RE) mapping in order to generate a NoMA transmission using standard (QAM, QPSK, BPSK, etc.) modulators. In this way, the bit-level operation is exploited to achieve the benefits of NoMA (e.g., improved spectral efficiency, reduced overhead, etc.) at significantly less signal processing and hardware implementation complexity. The bit-level operation is specifically designed to produce an output bit-stream that is longer than the input bit-stream, and that includes output bit-values that are computed as a function of the input bit-values such that when the output bit-stream is subjected to modulation (e.g., m-ary QAM, QPSK, BPSK), the resulting symbols emulate a spreading operation that would otherwise have been generated from the input bit-stream, either by a NoMA-specific modulator or by a symbol-domain spreading operation.

39 Claims, 12 Drawing Sheets

(56) References Cited

U.S. PATENT DOCUMENTS

| | | | |
|---|---|---|---|
| 2016/0036619 A1 | 2/2016 | Yan et al. | |
| 2017/0099098 A1 | 4/2017 | Lin et al. | |
| 2019/0115938 A1* | 4/2019 | Eroz | H03M 13/116 |
| 2019/0140770 A1* | 5/2019 | Eroz | H04L 1/0041 |
| 2019/0190753 A1 | 6/2019 | Bayesteh | |
| 2019/0223225 A1* | 7/2019 | Lee | H04W 74/0833 |
| 2020/0077375 A1* | 3/2020 | Stathakis | H04L 5/0007 |

FOREIGN PATENT DOCUMENTS

| | | |
|---|---|---|
| CN | 105790890 A | 7/2016 |
| CN | 106411456 A | 2/2017 |
| CN | 106561013 A | 4/2017 |
| CN | 107370708 A | 11/2017 |

OTHER PUBLICATIONS

R1-1608852 Huawei, HiSilicon, "Categorization and analysis of MA schemes", 3GPP TSG RAN WG1 Meeting #86bis, Lisbon, Portugal, Oct. 10-14, 2016, total 5 pages.

* cited by examiner

METHOD AND SYSTEM FOR NON-ORTHOGONAL MULTIPLE ACCESS COMMUNICATION

CROSS-REFERENCE TO RELATED APPLICATION

This application claims the benefit of U.S. Provisional Patent Application No. 62/654,075 filed Apr. 6, 2018 and is hereby incorporated by reference in its entirety.

FIELD

The present disclosure relates generally to wireless communication and, in particular embodiments, to methods and systems for non-orthogonal multiple access communication.

BACKGROUND

Multiple access is a function of wireless communication systems in which multiple users can share resources. Multiple access systems may be orthogonal or non-orthogonal. In orthogonal multiple access systems, such as time division multiple access (TDMA), frequency division multiple access (FDMA), and orthogonal frequency division multiple access (OFDMA), signals for different users are transmitted on different physical channel resources (e.g., time, frequency, or some combination). In non-orthogonal multiple access (NoMA) systems, such as code division multiple access (CDMA), interleave division multiple access (IDMA), interleave grid multiple access (IGMA), multi-user shared access (MUSA), and sparse code multiple access (SCMA), there may be cross-correlation of signals for different users. Intentionally introducing non-orthogonality may increase the spectrum efficiency but may create some challenges in terms of transmitter and receiver implementation. It is desirable to design a non-orthogonal multiple access transmission mechanism that simplifies and facilitates transmitter and receiver implementation.

SUMMARY

Technical advantages are generally achieved, by embodiments of this disclosure which describe methods and systems for non-orthogonal multiple access communication.

According to one aspect of the present invention, there is provided a method for using a bit-level operation to enable non-orthogonal multiple access (NoMA) communication using a standard modulator, the method comprising: generating, by the transmitter, an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of the input bit-stream by repetition and bit-level manipulation to achieve symbol spreading in one dimension of complex modulation scheme, the input bit-stream being an error-detection/correction encoded bit-stream; modulating, by the transmitter, the output bit-stream in accordance with the standard modulator to obtain a sequence of symbols, wherein bits from the first subset of output bits are used by the modulator to define the symbols of the sequence of symbols in one complex modulation dimension, and bits from the second subset of output bits are used by the modulator to define the symbols of the sequence of symbols in another complex modulation dimension; mapping, by the transmitter, the sequence of symbols to resource elements to obtain a NoMA signal; and transmitting the NoMA signal to a receiver.

Optionally, a spreading sequence applied in the spreading in combination with a symbol-to-resource element mapping applied in said mapping correspond to a particular multiple access signature.

Optionally, the method further comprises encoding, by a forward error correction (FEC) encoder, an unmodified input bit-stream to generate the error-detection/correction coded input bit-stream.

Optionally, transmitting the NoMA to a receiver comprises transmitting the NoMA signal from a base station to a UE, or transmitting the NoMA signal from a UE to a base station.

Optionally, different NoMA signals are transmitted to or by the same UE.

Optionally, different NoMA signals are transmitted to or by different UEs.

Optionally, transmitting the NoMA to a receiver comprises transmitting the NoMA signal from a UE to a base station, the method further comprising: the UE receiving an indication of a multiple access (MA) signature, the MA signature configuring the UE to use a specific bit-level operation and resource element mapping to distinguish the UE's uplink transmission from other UEs' uplink transmissions.

Optionally, transmitting the NoMA to a receiver comprises transmitting the NoMA signal from a base station to a UE, the method further comprising the base station transmitting an indication of a multiple access (MA) signature to the UE, the MA signature configuring the UE to use a specific bit-level operation and resource element mapping to decode a downlink NoMA transmission.

Optionally, the method further comprises adaptively adjusting the bit-level operation between: performing said repetition and spreading for bits defining one dimension of the complex modulation scheme; and performing operations that equate with spreading in the symbol domain.

Optionally, the method further comprises adaptively adjusting the bit-level operation between: performing said repetition and spreading for bits defining one dimension of the complex modulation scheme; and performing bit level operations that equate to no spreading being performed.

Optionally, the method further comprises adaptively adjusting the bit-level operation between: performing said repetition and spreading for bits defining one dimension of complex modulation scheme; performing operations that equate with spreading in the symbol domain; and performing bit level operations that equate to no spreading being performed.

Optionally, the method further comprises transmitting signaling indicating which bit-level operation to perform when receiving the NoMA signal.

According to another aspect of the present invention, there is provided an apparatus comprising: a processor; and a non-transitory computer readable storage medium storing programming for execution by the processor, the programming including instructions for: generating an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of the input bit-stream by repetition and bit-level manipulation to achieve symbol spreading in one dimension of complex modulation scheme, the input bit-stream being an error-detection/correction encoded bit-stream; modulating, by the transmitter, the output bit-stream in accordance with the standard modulator to obtain a sequence of symbols, wherein bits from the first subset of output bits are used by the modulator to define the symbols of the sequence of symbols in one complex modulation dimension, and bits from the second subset of output bits are used by the modulator to define the symbols of the sequence of symbols in another complex modulation dimension; mapping, by the transmitter, the sequence of symbols to resource elements to obtain a NoMA signal; and transmitting the NoMA signal to a receiver.

According to another aspect of the present invention, there is provided an apparatus comprising: a bit level processor configured to generate an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of the input bit-stream by repetition and bit-level manipulation to achieve symbol spreading in one dimension of complex modulation scheme, the input bit-stream being an error-detection/correction encoded bit-stream; a modulator connected to modulate the output bit-stream in accordance with a standard modulation scheme to obtain a sequence of symbols, wherein bits from the first subset of output bits are used by the modulator to define the symbols of the sequence of symbols in one complex modulation dimension, and bits from the second subset of output bits are used by the modulator to define the symbols of the sequence of symbols in another complex modulation dimension; a symbol-to-resource element mapper configured to map the sequence of symbols to resource elements to obtain a NoMA signal; and a transmitter configured to transmit the NoMA signal to a receiver.

According to another aspect of the present invention, there is provided a computer program product comprising a non-transitory computer readable storage medium storing programming, the programming including instructions to: generate an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of the input bit-stream by repetition and bit-level manipulation to achieve symbol spreading in one dimension of complex modulation scheme, the input bit-stream being an error-detection/correction encoded bit-stream; modulate the output bit-stream in accordance with the standard modulator to obtain a sequence of symbols, wherein bits from the first subset of output bits are used by the modulator to define the symbols of the sequence of symbols in one complex modulation dimension, and bits from the second subset of output bits are used by the modulator to define the symbols of the sequence of symbols in another complex modulation dimension; map the sequence of symbols to resource elements to obtain a NoMA signal; and transmit the NoMA signal to a receiver.

BRIEF DESCRIPTION OF THE DRAWINGS

For a more complete understanding of the present disclosure, and the advantages thereof, reference is now made to the following description taken in conjunction with the accompanying drawings, in which.

DETAILED DESCRIPTION

Figure 1:
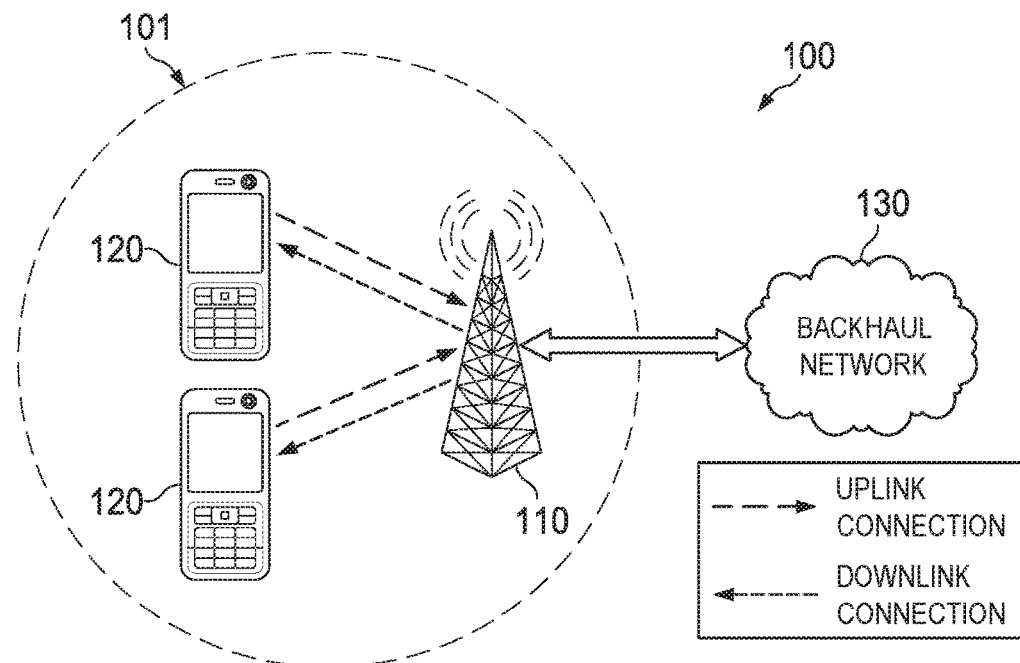
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Conventional non-orthogonal multiple access (NoMA) transmitters generally require inclusion of one or more NoMA-specific operations in the transmission chain. These NoMA-specific operations may involve modification of existing modules and operations in a conventional orthogonal multiple access transmitter, or may involve the addition of further modules and operations on top of the existing modules and operations in the conventional orthogonal multiple access transmitter. NoMA-specific operations may apply an MA signature to a signal prior to transmission in order to facilitate multi-stream detection. As used herein, the term "MA signature" refers to a transmitter operation that generates a NoMA signal for a particular layer/stream based on one or more stream-specific features, which allows the NoMA signal to be multiplexed with other NoMA signals that are transmitted over the same set of resource elements such that the respective NoMA signals may be decoded using multi-stream detection techniques at the corresponding receiver(s). It should be appreciated that MA signatures may take different forms depending upon the multiple access scheme that is being implemented. For example, if spreading is used, then the MA signatures may correspond to a spreading sequence applied to the signal. As another example, MA signatures may correspond to an interleaving pattern (in bit or symbol domain) or a symbol to resource mapping pattern.

Complex NoMA schemes may be implemented using a non-standard, NoMA-specific modulator, which directly converts a bit-stream into data symbols having the desired properties of the particular NoMA scheme. However, the hardware implementation of a non-standard, NoMA-specific modulator is significantly more complex than a conventional hardware implementation using standardized modulators such as Quadrature Amplitude Modulation (QAM), Binary Phase Shift Keying (BPSK), $$\frac{\pi}{2} - BPSK$$

modulator, and Quadrature Phase Shift Keying (QPSK, also known as 4-QAM). Therefore, due to this increased complexity and expense, NoMA-specific modulators may be unsuitable for many practical applications. As a result, wireless telecommunication standards that have historically mandated the use of standard modulators (e.g., BPSK modulator, $$\frac{\pi}{2} - BPSK,$$

QPSK, 16-QAM, 64-QAM, 256-QAM, etc.) have been reluctant to adopt advanced NoMA implementations, despite their considerable theoretical performance benefits. Advantages of NoMA include improved spectral efficiency and reduced overhead, which are achieved in so far as NoMA generally provides increased multiplexing layers and multiplexed connection density, as well as flexible resource allocation/utilization and interference mitigation through a reduction of collisions.

For another example, some NoMA schemes are conventionally implemented using additional symbol-domain operations on top of common operations in the transmitter. In other words, even if the NoMA scheme is implemented using a standard modulator, some conventional NoMA schemes require additional processing of the symbols generated by the standard modulator. In many cases, these additional symbol-domain operations are complex or proprietary and may not be hardware implementation-friendly.

Accordingly, embodiments of the present disclosure describe hardware-friendly examples of advanced NoMA implementations, which may be easily and readily utilized in next-generation standards to take advantage of the performance benefits of said NoMA implementations with little or no undesirable impact on hardware complexity. Embodiments of the present disclosure describe techniques that may be used for implementing NoMA transmission capabilities using standard modulators (e.g., m-ary QAM, QPSK, BPSK, or $$\frac{\pi}{2} - BPSK).$$

Furthermore, embodiments of the present disclosure also describe techniques that may be used for implementing NoMA transmission capabilities without complex or proprietary symbol-domain operations.

According to embodiments of the present disclosure, advanced NoMA schemes include NoMA schemes that employ an operation known as "spreading." In the present disclosure, spreading is defined to encompass operations that associate a value of at least one input bit in the transmission chain, with two or more symbols generated in the transmission chain. That is, the value of the one input bit becomes associated with two or more symbols transmitted over physical resources.

Embodiments of the present disclosure describe spreading that involves a transmitter operation that creates a relationship between symbols in a sequence of symbols that depends on input bit values of the input bit stream such that different relationships between symbols are formed for different combinations of input bit-values. The spreading operations defined below that relate to spreading in only one dimension of a complex modulation scheme are examples of spreading that create such a special relationship or dependency between symbols in a sequence of symbols.

Conventionally, spreading operations are implemented in the symbol-domain, either using a non-standard, NoMA-specific modulator, or using additional NoMA-specific symbol-domain operations. In an aspect, the present disclosure aims to implement these spreading operations in the bit-domain, not in the symbol-domain, and without the use of a non-standard, NoMA-specific modulator.

While certain aspects of the present disclosure are particularly applicable to NoMA schemes that employ spreading, some aspects the present disclosure also provide benefits to other NoMA schemes in general and, therefore, are not limited to any specific spreading schemes. Specifically, aspects of the present disclosure also describe bit-domain implementations of generalized MA signature generation, which includes other operations such as scrambling and interleaving, in addition to spreading.

Aspects of this disclosure utilize a bit-level operation prior to modulation and resource element (RE) mapping in order to generate a NoMA transmission using standard (QAM, QPSK, BPSK, $$\frac{\pi}{2} - BPSK,$$

etc.) modulators. In this way, the bit-level operation is exploited to achieve the benefits of NoMA (e.g., improved spectral efficiency, reduced overhead, etc.) at significantly less signal processing and hardware implementation complexity. The bit-level operation is specifically designed to produce an output bit-stream that is longer than the input bit-stream, and that includes output bit-values that are computed as a function of the input bit-values such that when the output bit-stream is subjected to modulation (e.g., m-ary QAM, QPSK, $$\frac{\pi}{2} - BPSK),$$

the resulting symbols emulate a spreading operation that would otherwise have been generated from the input bit-stream, either by a NoMA-specific modulator or by a symbol-domain spreading operation.

The output bit-stream is then separated into two or more subsets of output bits, which are modulated using one or more standard modulators to generate a sequence of two or more symbols, which together form/emulate a symbol sequence having spreading. In one embodiment, the subsets of output bits are modulated in parallel using two or more QAM modulators. In other embodiments, the subsets of output bits are modulated in sequence using the same QAM modulator. The sequence of symbols may then be mapped, or otherwise spread across, a set of resource elements (REs) to produce a NoMA signal, which can be transmitted to a corresponding receiver, e.g., a user equipment (UE), base station, etc. Using bit-level operations, in conjunction with QAM modulation and RE-to-symbol mapping, to generate NoMA signals reduces the complexity of NoMA signal generation because bit-level operations are easier to implement than symbol-level operations. Additionally, using bit-level operations, rather than NoMA-specific modulation, provides greater flexibility in terms of diversified NoMA signal generation because bit level processing can be implemented/updated in software with little or no modifications in hardware. All of this reduced complexity also serves to reduce the cost of designing and manufacturing NoMA capable transceiver chips. Although many embodiments are described as implementing bit-level operations with standard NoMA modulators, it should be appreciated that the bit-level operations provided herein may also be implemented with non-standard NoMA modulators. These and other aspects are described in greater detail below.

FIG. 1 is diagram of a network 100 for communicating data. The network 100 comprises a base station 110 having a coverage area 101, a plurality of user equipments (UEs) 120, and a backhaul network 130. As shown, the base station 110 establishes uplink (long dashed line) and/or downlink (short dashed line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an enhanced Node B (eNB), a transmit/receive point (TRP), a macro-cell, a femtocell, a Wi-Fi access point (AP), and other wirelessly enabled devices. Base stations may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

In conventional orthogonal multiple access schemes, the data carried on the uplink connections and the downlink connections, of the different mobile devices, use different physical resource elements (e.g., time, frequency, code, etc.). While relatively simple and implementation-efficient, orthogonal multiple access schemes suffer from relatively poorer spectrum efficiency. Implementation-friendly non-orthogonal multiple access methods are desired to improve the spectrum efficiency of wireless communication systems.

Figure 2:
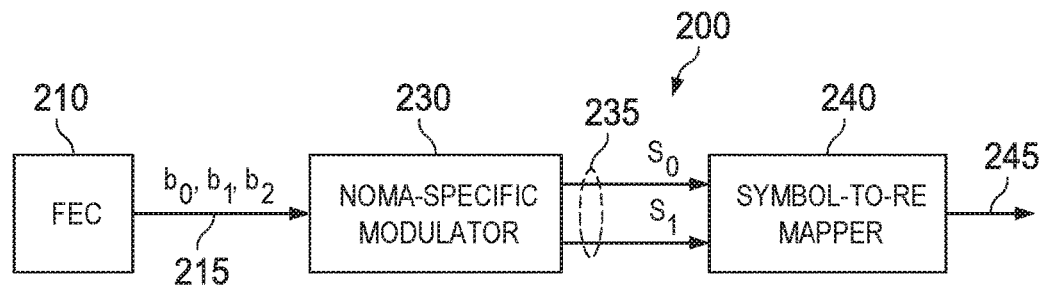
FIG. 2 is a diagram of a conventional NoMA transmitter that relies on a NoMA-specific modulator to generate a sequence of symbols.

FIG. 2 is a diagram of a conventional transmitter 200 that uses NoMA-specific modulation techniques to generate a NoMA signal. As shown, the conventional transmitter 200 includes a forward error correction (FEC) encoder 210, a NoMA-specific modulator 230, and a symbol-to-RE mapper 240. The FEC encoder 210 generates a bit-stream 215, which is forwarded to the NoMA-specific modulator 230. The NoMA-specific modulator 230 may be a sparse code multiple access (SCMA) modulator, MUSA or any other type of modulator that is configured to generate a sequence of symbols 235 based on the bit-stream 215 such that at least one bit (e.g., b2, etc.) of the bit-stream 215 is associated with both symbols $S_1$ and $S_2$ of the sequence of symbols 235. The terms "sequence of symbols" and "set of symbols" are used interchangeably herein to refer to symbols that are generated in parallel or sequentially by one or more modulators. The sequence of symbols 235 is then transmitted to the symbol-to-RE mapper 240, which spreads the symbols of the sequence of symbols 235 across a set of resource elements to generate a NoMA signal 245.

As discussed above, NoMA-specific modulators are relatively complex, and as a result, may be unsuitable for some applications. Embodiments of this disclosure introduce a bit-level operation prior to BPSK, $$\frac{\pi}{2} - BPSK,$$

QPSK, and/or QAM modulation in order to generate a sequence of symbols using standard QAM modulators.

Figure 3:
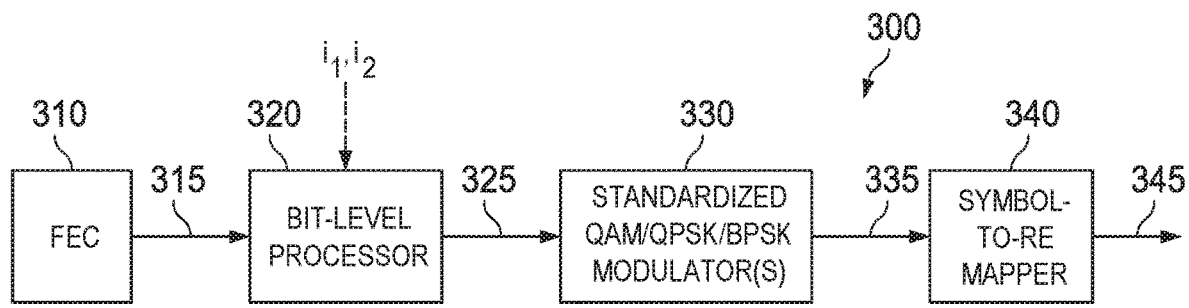
FIG. 3 is a diagram of an embodiment NoMA transmitter that uses a bit-level operation and QAM modulator to generate a NoMA signal.

FIG. 3 is a diagram of an embodiment transmitter 300 that uses a bit-level operation 320 in conjunction with BPSK, $$\frac{\pi}{2} - BPSK,$$

QPSK, and/or QAM modulators 330, 331 to generate a NoMA signal 345. As shown, the embodiment transmitter 300 includes an FEC encoder 310, a bit-level processor 320, BPSK, $$\frac{\pi}{2} - BPSK,$$

QPSK, and/or QAM modulator 330, and a symbol-to-RE mapper 340. The FEC encoder 310 may be any encoder configured to produce an error-detection/correction encoded bit stream, including (but not limited to) a Turbo encoder, a low-density parity-check (LDPC) encoder, and/or a polar encoder. An error detection/correction encoded bit stream may be a bit-stream that includes error correction bits (e.g., parity bits, FEC bits, etc.) and/or error detection bits (e.g., cyclic redundancy check (CRC) bits, etc.). The FEC encoder 310 generates an input bit-stream 315, and forwards the input bit-stream 315 to the bit-level processor 320. The bit-level processor 320 performs a bit-level operation on the input bit-stream 315 to generate an output bit-stream 325 that is longer than the input bit-stream. The bit-level operation may be defined by one or more input parameters (shown as $i_1$, $i_2$, in FIG. 2) which are discussed in greater detail below. The bit-level operation utilizes a multiple access (MA) signature in order to enable multi-stream detection at the receiver. In this way, the bit-level operation emulates the symbol-domain operations of a NoMA-specific modulator, and is therefore different than conventional bit-level operations, such as error-correction, error-detection, and rate-matching bit-level operations, which serve to provide error-detection, error-correction, or coding gain manipulation in the bit-domain. The output bit-stream 325 is then forwarded to the BPSK, π/2-BPSK, QPSK, and/or QAM modulator(s) 330, where different sub-sets of bits from the output bit-stream 325 are modulated separately to create a corresponding symbol in a sequence of symbols that collectively form a sequence of symbols 335.

The BPSK, $$\frac{\pi}{2} - BPSK,$$

QPSK, and/or QAM modulator(s) 330 may include a single QAM modulator that modulates the respective sub-sets of bits in a consecutive manner to generate each of the corresponding symbols of the sequence of symbols 335. Alternatively, the BPSK, $$\frac{\pi}{2} - BPSK,$$

QPSK, and/or QAM modulator(s) 330 may include two or more BPSK, $$\frac{\pi}{2} - BPSK,$$

QPSK, and/or QAM modulators that modulates the respective sub-sets of bits in a parallel manner to generate the symbols of the sequence of symbols 335. The QAM modulator(s) 330 may include any BPSK, $$\frac{\pi}{2} - BPSK,$$

QPSK, and/or m-ary QAM modulator, e.g., a 4-QAM, 8-QAM, 16-QAM, 64-QAM, 256-QAM. The sequence of symbols 335 is then forwarded to the symbol-to-RE mapper 340, which maps the corresponding sequence of symbols to a set of REs in order to obtain a NoMA signal 345. The NoMA signal 345 is then transmitted to a receiver.

Figure 4:
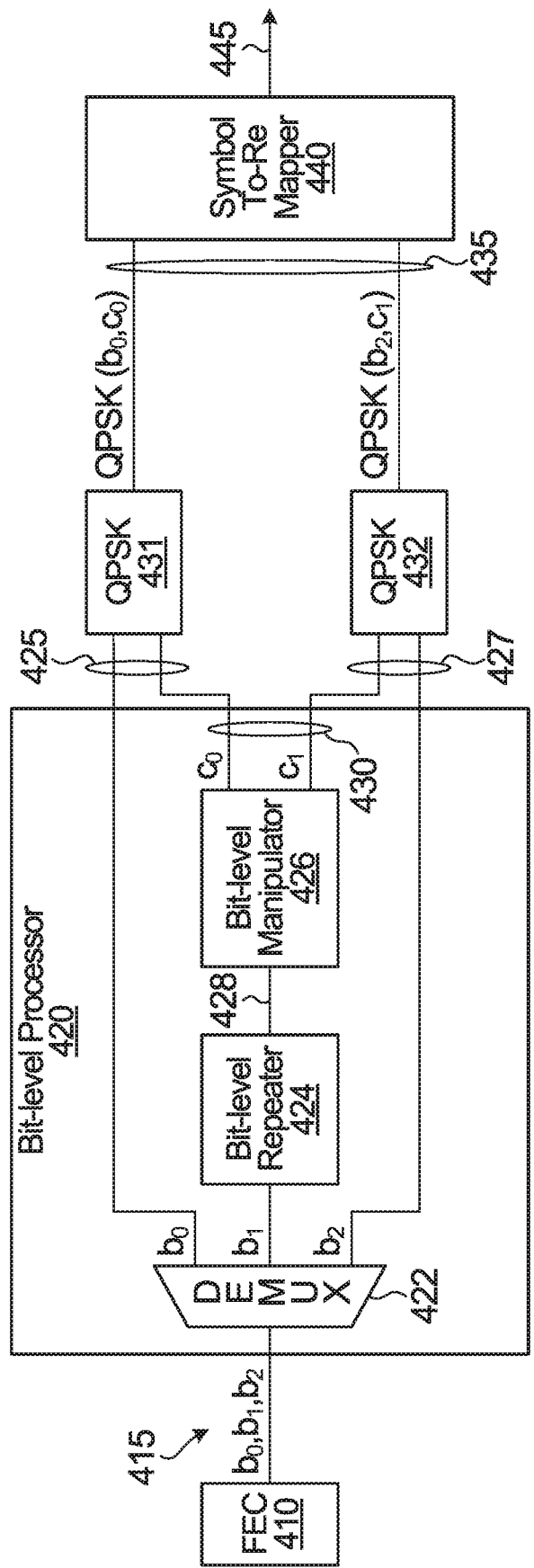
FIG. 4 is a diagram of another embodiment NoMA transmitter that uses a bit-level operation and QPSK modulators to generate a NoMA signal.

FIG. 4 is a diagram of an embodiment transmitter 400 that uses a bit-level operation 420 in conjunction with parallel QPSK modulators 431, 432 to generate a NoMA signal 445. As shown, the embodiment transmitter 400 includes an FEC encoder 410, a bit-level processor 420, QPSK modulators 431, 432, and a symbol-to-RE mapper 440. The FEC encoder 410 and symbol-to-RE mapper 440 may be configured similarly to the FEC encoder 310 and symbol-to-RE mapper 340 in FIG. 3. In this example, the FEC encoder 410 generates an input bit-stream 415 that includes three bits ($b_0$, $b_1$, $b_2$), and forwards the input bit-stream 415 to the bit-level processor 420, which performs a bit-level operation on the input bit-stream 415 to generate a first output bit-stream 425 that includes two bits ($b_0$, $c_0$), and a second output bit-stream 427 that includes two bits ($b_2$, $c_1$). The two bit streams 425,427 are modulated in parallel by the QPSK modulators 431, 432 to generate two symbols, namely $S_1$ and $S_2$ (respectively), that collectively form a sequence of symbols 435. Each QPSK modulator 431 has two inputs, and one of the two inputs defines the real component of a QPSK symbol and the other input defines the imaginary component of the QPSK symbol. It should be appreciated that, in other examples, the subsets of bits ($b_0$, $c_0$), ($b_2$, $c_1$) may be modulated serially by a single QPSK modulator. The symbols $S_1$, $S_2$ are then mapped to a set of REs by the symbol-to-RE mapper 440 to obtain a NoMA signal 445, which is transmitted to a receiver, e.g., a UE or base station/NodeB.

In the specific example shown, the bit-level processor 420 includes a bit-level demultiplexer (or serial to parallel converter) 422, a bit-level repeater 424, and a bit-level manipulator 426 to achieve symbol spreading in one dimension of a complex modulation scheme (e.g., m-ary QAM, QPSK, etc. modulation), the functionality of which is detailed below. In some examples, the bit-level manipulator 426 applies a spreading sequence to the transmission for generating the NoMA signal.

In operation, the demultiplexer takes an input bit stream containing the three input bits ($b_0$, $b_1$, $b_2$), and produces three separate streams containing bits $b_0$, $b_1$, $b_2$ respectively. Alternatively, the bits $b_0$, $b_1$, $b_2$ may arrive separately (in parallel) from the FEC encoder 410 in which case there is no need for the demultiplexer 422. The bit-level repeater 424 repeats the input bit $b_1$ to produce a stream 428 containing $b_1$, $b_1$. The stream 428 is then processed by the bit-level manipulator 426 to produce a subset of output bits 430 ($c_0$, $c_1$) which are input to QPSK modulators 431 and 432 respectively. In the illustrated example, it can be seen that input bits ($b_0$, $b_2$) go directly to the QPSK modulators 431,432 as a subset of output bits without repetition or bit-level spreading, and these bits define the real component of the generated QPSK symbols. Input bit $b_1$ on the other hand undergoes a repetition and then bit-level manipulation operation; ultimately, the value of $b_1$ goes on to define the imaginary component of both QPSK symbols 431,432. In this sense, it can be said that bit-level repetition and manipulation occur in the imaginary domain only for the example of FIG. 4.

The bit-level manipulator will now be described in further detail. In general, the objective of the bit-level manipulator is to achieve the equivalent of symbol domain spreading in one dimension of complex symbol domain. The functionality will be described in the context of a specific set of spreading sequences of length 2 (including spreading sequences (1,1) and (1,-1)), but the same approach applies to sets of spreading sequences generally, including other sets of spreading sequences of length two, and sets of longer spreading sequences. To begin, a brief description of the result to be achieved in the symbol domain, followed by a description of how this is realized with bit-level manipulation.

Starting with symbols with no spreading, we have two symbols:

$$S1=x1+iy1; S2=x2+iy2.$$

If the dimension is to be spread is the real dimension, then for a spreading sequence of $(s_1,s_2)=(1,1)$, the spreading has no effect, and the output is:

$$S1=s_1x1+iy1; S2=s_2x2+iy2$$

which results in:

$$S1=x1+iy1; S2=x2+iy2$$

If the dimension is to be spread is the real dimension, then for a spreading sequence of $(s_1,s_2)=(1,-1)$, an output is produced in which the real component of the second symbol is negated:

$$S1=s_1x1+iy1; S2=s_2x2+iy2$$

which results in:

$$S1=x1+iy1; S2=-x2+iy2$$

If the dimension is to be spread is the imaginary dimension, then for a spreading sequence of $(s_1,s_2)=(1,1)$ the spreading has no effect, and the output is:

$$S1=x1+is_1y1; S2=x2+is_2y2$$

which results in:

$$S1=x1+iy1; S2=x2+iy2$$

If the dimension is to be spread is the imaginary dimension, then for a spreading sequence of $(1,-1)$ an output is produced in which the imaginary component of the second symbol is negated:

$$S1=x1+is_1y1; S2=x2+is_2y2$$

which results in:

$$S1=x1+iy1; S2=x2+-iy2$$

As noted above, in the provided system, the spreading is not performed in the symbol domain, but rather bit-level manipulations are performed to yield the same result. This depends on the specifics of the constellation and QAM modulation. This can be achieved through table look-up, or other more simple manipulation depending on the specific constellation and mapping.

For the first and third examples above, the spreading will have no effect.

For the second example, we need to achieve S1=x1+iy1; S2=−x2+iy2 with bit-level operations. With knowledge of the constellation definition, the bit-level operation needs to map bits that would map to x2 to corresponding bits that map to −x2.

For the fourth example, we need to achieve S1=x1+iy1; S2=x2+−iy2. With knowledge of the constellation definition, the bit-level operation needs to map bits that would map to y2 to corresponding bits that map to −y2.

It should be apparent how the described approach can be generalized to an arbitrary spreading sequence and constellation definition.

In another embodiment, the bit-level repetition and spreading occurs in the real dimension only.

More generally, the bit-level manipulator 426 performs bit manipulation to achieve the equivalent of applying one of a set of orthogonal spreading sequences in the symbol domain. The combination of the spreading sequence applied by the bit-level manipulator 426 and the pattern applied by the symbol-to-RE mapper 440 relates to a particular MA signature.

In some embodiments, one or more input parameters ($i_1$, $i_2$, etc.), define which spreading sequence to apply in the bit-level operations, and/or the symbol to resource element mapping to perform.

Figure 5A:
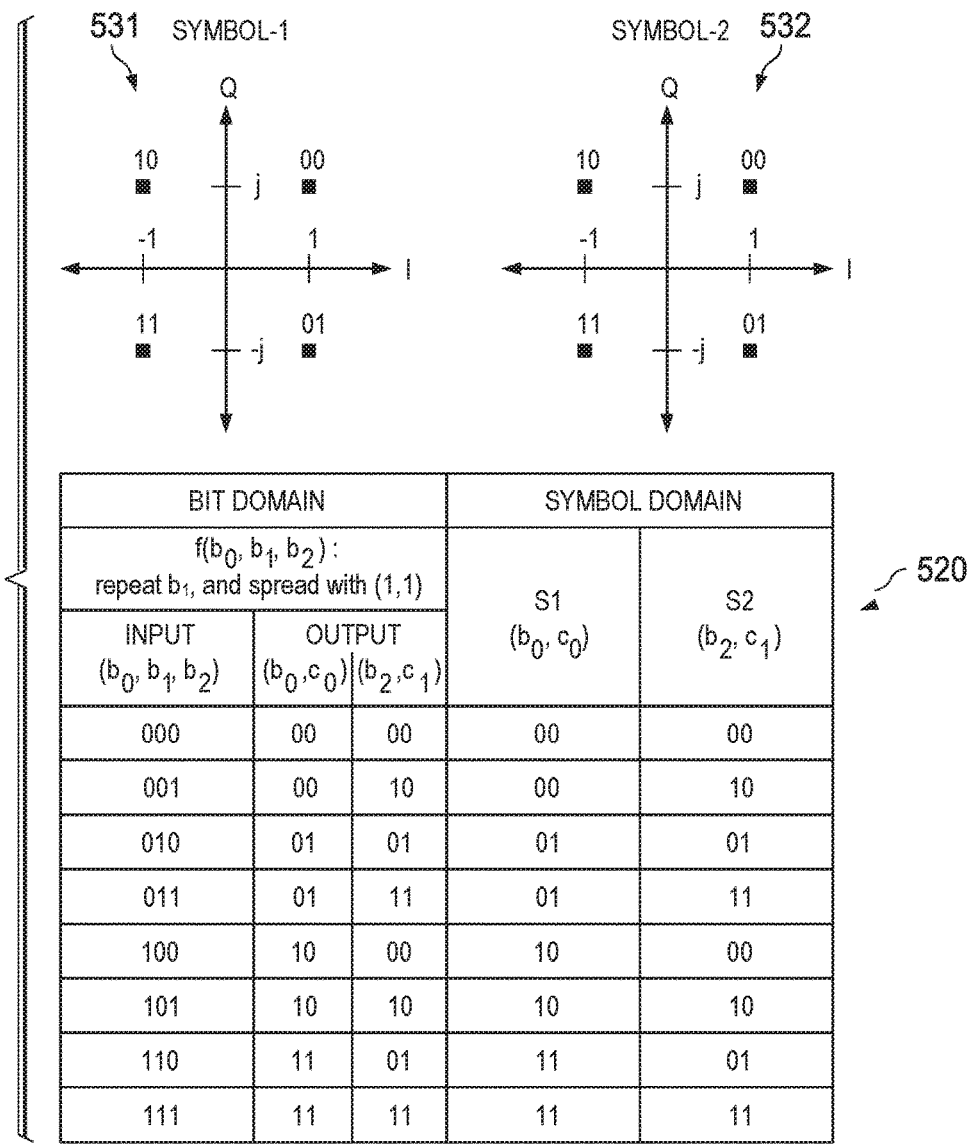
FIGS. 5A-5B are diagrams of look-up tables corresponding to example bit-level operations and example constellation diagrams corresponding to QPSK modulators used to generate the sequence of symbols in FIG. 4.
Figure 5B:
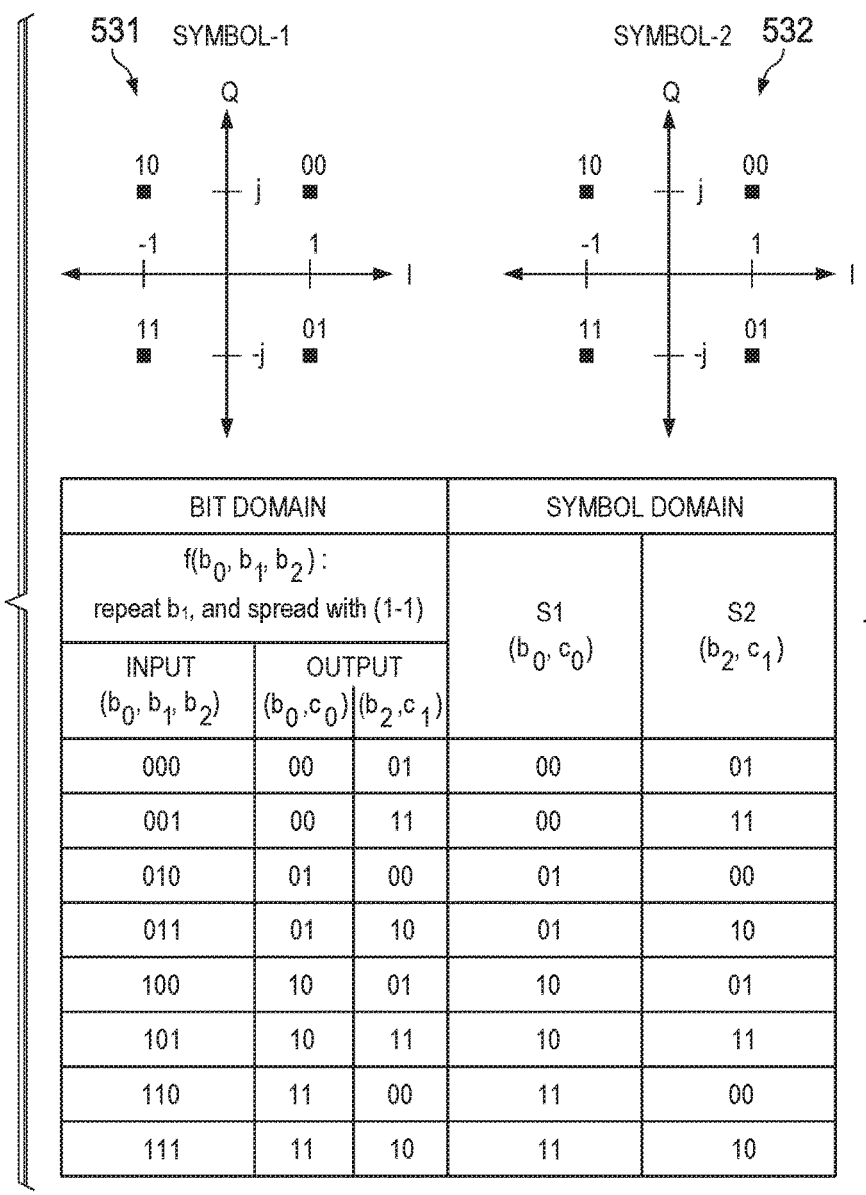

FIGS. 5A and 5B depict look-up tables 520, 570 and constellation diagrams 531, 532 for generating the sequence of symbols 435 in FIG. 4 using spreading sequences is (1,1) and (1,−1) respectively to achieve symbol spreading in the imaginary dimension. Referring to the constellation diagram 532 for the second symbol, a "−1" operation in the imaginary dimension is achieved simply by flipping the second bit, i.e. a "1" becomes a "0", and a "0" becomes a "1". In this case, the bit-level manipulator can be implemented as an inverter function for the bit mapped to the complex dimension of the second symbol.

The look-up tables 520, 570 correspond to different bit-level operations for converting the input bit-stream 415 to the output bit-streams 425,427 at the bit-level processor 420, and associate different bit-values of the input bit-stream 415 with resulting bit-values of the output bit-stream 425 as would result from execution of the corresponding bit-level operations, as well as identify the corresponding values of the symbols $S_1$, $S_2$ that would be obtained from modulating the resulting output bit-values at the QPSK modulators 431, 432 according to the constellation diagrams 531, 532. In particular, the look-up table 520 corresponds to bit-level operation: $f(b_0, b_1, b_2)=(b_0, c_0), (b_2, c_1)$ using spreading sequence (1,1) in the imaginary symbol domain, and the look-up table 570 corresponds bit-level operation: $=f(b_0, b_1, b_2)=(b_0, c_0), (b_2, c_1)$ using spreading sequence (1,−1) in the imaginary symbol domain, where $b_0$, $b_1$, and $b_2$ are input bit-values of the input bit-stream. It should be appreciated that the bit-level operations reflected by the look-up tables 520, 570 are two of many possible bit-level operations that feature repetition and spreading in only one of the real and complex symbol domain, that can be used in conjunction with QPSK modulators 431, 432 to convert the input bit-stream 415 into the output bit-streams 425, 427.

After using the bit-level operations to process the input bit-stream 415, the resulting output bit-streams 425,427 are QPSK modulated based on the constellation diagrams 531, 532 to produce respective symbols in a pair of symbols: $S_1=[b_0, c_0]$ and $S_2=[b_2, c_1]$. It should also be appreciated that the constellation diagrams 531, 532 are provided as examples, and that different constellation diagram configurations may be used to modulate the output bit-stream 425 into the sequence of symbols S1, S2.

When the bit-level operation corresponding to the look-up table 520 is used or the lookup table 570 is used, the input bit value $b_1$ of the input bit-stream 415 is associated with both symbols $S_1$, $S_2$. From this, it can be appreciated that, by virtue of the bit-level operations, the values of both symbols $S_1$ and $S_2$ depend, at least partially, on the same input-bit, which creates a relationship between symbol $S_1$ and symbol $S_2$ that is associated with a component of an MA signature, and that can be exploited by the receiver to mitigate multi-user interference between the instant NoMA signal and other NoMA signals transmitted over the same REs. In particular, the receiver may process symbols $S_1$ and $S_2$ in an iterative fashion using, for example, a message passing algorithm (MPA) to generate log likelihood ratios (LLRs) for each the input-bits $b_0$, $b_1$, and $b_2$. The LLRs of three input-bits can then be sent to an FEC decoder for bit-level decoding, in which the LLRs are further processed until a hard-decision is made for each input bit $b_0$, $b_1$, and $b_2$. It should be noted that, in this example, the relation between symbols $S_1$ and $S_2$ is dependent on the value of the input bit $b_1$ such that changing the value of $b_1$ will impact the relationship between $S_1$ and $S_2$. In addition, the relation between symbols $S_1$ and $S_2$ is dependent on the spreading sequence applied in the bit level spreader. This input bit-dependent relationship between symbols of a NoMA signal is beneficial in so far as it provides an additional degree of freedom to multi-user detection.

Figure 5C:
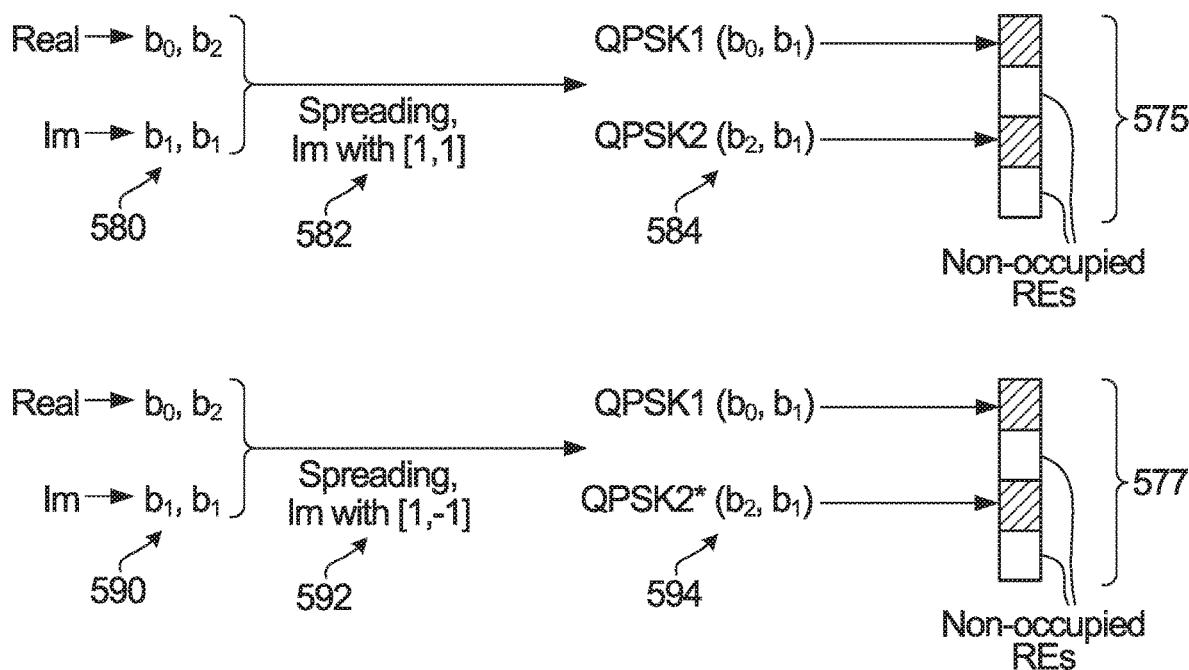
FIG. 5C depicts another specific example of repetition and spreading on one dimension based on an 8 point codebook.

Referring now to 5C, generally indicated at 575 is a specific example of the embodiment of FIG. 5A,5B above where bitwise repetition is performed for the imaginary component at 580 followed by spreading using (1,1) of the imaginary component at 582, and resource element mapping at 584 to two resources out of a set of four possible resources, the remaining resources being non-occupied. Generally indicated at 577 is a corresponding depiction where spreading using (1,−1) is performed. The examples of FIG. 5C are referred to as 8 point code books since three input bits map to 8 possible outputs. It is noted that in the example of FIG. 5C (and also for later described example of FIG. 9B) the specific non-occupied REs are only for illustrative purposes. Depending on the resource mapping, the locations of the occupied non-zero symbols can change. The location of the non-zero symbols only partially represent the MA signature. The full MA signature also depends on the spreading sequence.

In general, there is a respective codebook for each permutation of the spreading sequence and the resource element mapping. Where a spreading sequence of length 2 is used there are two possible spreading sequences, and where a resource element mapping selects two resources out of four, there are six possible resource element mappings. Thus, there are 2×6=12 unique permutations of the spreading sequence and the resource element mapping.

Figure 6:
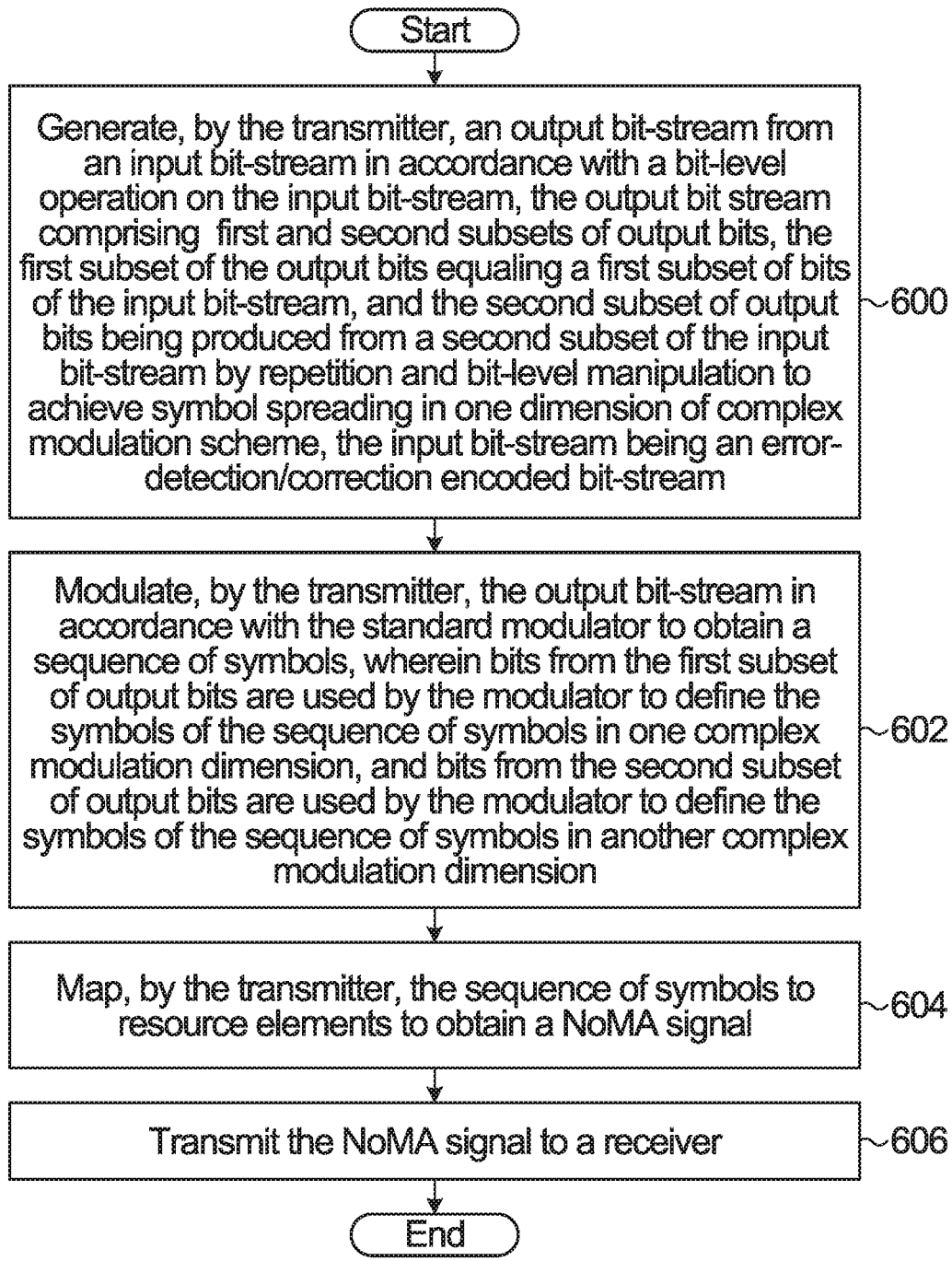
FIG. 6 is a flowchart of an embodiment method for using a bit-level operation to generate a NoMA signal.

FIG. 6 is a flowchart of an embodiment method 600 for using a bit-level operation and QAM modulators to generate a NoMA signal, as may be performed by a transmitter. The method begins in block 600 with generating, by the transmitter, an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of the input bit-stream by repetition and bit-level manipulation to achieve symbol spreading in one dimension of a complex modulation scheme, the input bit-stream being an error-detection/correction encoded bit-stream. The method continues in block 602 with modulating, by the transmitter, the output bit-stream in accordance with the standard modulator to obtain a sequence of symbols, wherein bits from the first subset of output bits are used by the modulator to define the symbols of the sequence of symbols in one complex modulation dimension, and bits from the second subset of output bits are used by the modulator to define the symbols of the sequence of symbols in another complex modulation dimension. The method continues in block 604 with mapping, by the transmitter, the sequence of symbols to resource elements to obtain a NoMA signal. The method continues in block 606 with transmitting the NoMA signal to a receiver.

Embodiments of this disclosure provide methods for generating NoMA signals using a bit level operation in conjunction with m-ary QAM modulator(s). The resulting output bit-stream may be a function of the input bit-stream, and different sub-sets of bits in the output bit-stream may be modulated separately using m-ary QAM modulator(s) to produce a sequence of symbols, which may then be mapped to resource elements (REs) via a symbol-to-RE mapper in order to generate a NoMA signal.

Embodiment bit-level operations may utilize a multiple access (MA) signature to process the input bit-stream in order to emulate symbol domain operations of a NoMA modulator. In this way, the embodiment bit-level operations differ from conventional bit-level operations, such as FEC, CRC, and rate matching bit-level operations which provide error-correction, error detection and rate matching in the bit-domain, but do not serve to enable multi-user detection in the symbol domain.

Conventionally, the relationship of the symbols in a NoMA signal is achieved by symbol domain operations that are performed after the bit-stream is modulated into symbols. These symbol domain operations create a relationship between symbols in the resulting sequence of symbols corresponding to the underlying MA signatures, which allows receivers to detect which multiple access layer carries their NoMA signal, as well as serves to mitigate multi-user/inter-stream interference between the corresponding NoMA signal and other NoMA signals transmitted over the same resources.

Figure 7:
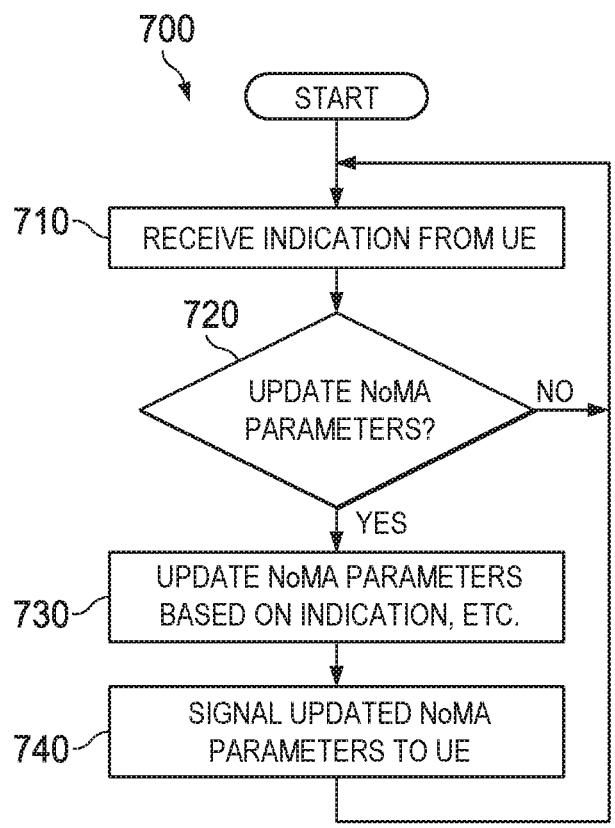
FIG. 7 is a flowchart of an embodiment method for selecting NoMA parameters.

FIG. 7 is a flowchart of an embodiment method 700 for selecting NoMA parameters, as might be performed by a base station. At step 710, the base station receives an indication from at least one UE and/or from other base station(s). The indication may include any information that may facilitate selection of the NoMA parameters by the base station, including peak to average power ratio (PAPR) requirements, application type, transmission type/mode, transport block size (TBS), spectral efficiency (SE), modulation and coding scheme (MCS), UE capability, and key performance indicator (KPI). The UE may indicate or report the parameters to the network explicitly or implicitly, for example, by making the selection linked to a UE identifier using a pre-configured mapping. Other explicit or implicit signaling possibilities also exist for communicating the parameters from the UE to the network, or vice versa. At step 720, the base station determines whether to update the NoMA parameters based on the indication. If so, then the base station updates the NoMA parameters at step 730, and signals the updated NoMA parameters to the UE at step 740, after which the method 700 reverts back to step 710. Otherwise, if the base station decides not to update the NoMA parameters during step 720, then the method 700 reverts back to step 710 without steps 730 and 740 being performed. The parameters may include one or more parameters that define which MA signature to use, the MA signature being defined by a spreading sequence and a resource element mapping.

During step 730, the base station may update the NoMA parameters based on the indication received during step 710, indications received from other UEs being served by the base station, indications received from UEs being served by neighboring base stations, measurements taken by the base station (e.g., measurements derived from uplink pilots, reference signals, data, etc.), information received from other neighboring base stations (e.g., measurements, scheduling information, NoMA parameters assigned/used by neighboring base stations, etc.), and/or downlink information transmitted to the UEs. The NoMA parameters may include parameters that identify or configure the MA signatures (e.g., $i_1$, $i_2$, etc.), NoMA signal generation constraints (e.g., scrambling/spreading bit-level operations parameters), as well as NoMA related measurements that are to be taken and fed back to the base station. The NoMA parameters may be communicated via Radio Resource Control (RRC) signaling, downlink control information (DCI) messages, and/or media access control (MAC) control element (MAC-CE) signaling. Although the NoMA parameters are selected by the base station in the example corresponding to the embodiment method 700, it should be appreciated that the NoMA parameters may be selected by the UE in other examples. For instance, a UE may select NoMA parameters based on indications from network. In some examples, some NoMA parameters are selected by the UE, while other NoMA parameters are selected by the base station. In some other embodiments, UE identifier (UE id) can be used for NoMA parameters selection by a UE. It should be appreciated that the NoMA parameters selected by the base station and/or the UE may be used to transmit uplink and/or downlink NoMA signals. When the NoMA parameters are used for uplink transmissions, the base station may send a signal that specifies NoMA parameters selected by the base station and/or information to be used for selection of NoMA parameters by the UE, and the UE may use the indicated NoMA parameters to transmit uplink NoMA signals. When the NoMA parameters are used for downlink transmissions, the base station may send a signal that specifies NoMA parameters selected by the base station and/or information to be used for identification of NoMA parameters by the UE, and the UE may use the indicated NoMA parameters for decoding of one or more downlink NoMA signals using a multi-stream detection techniques.

Figure 8:
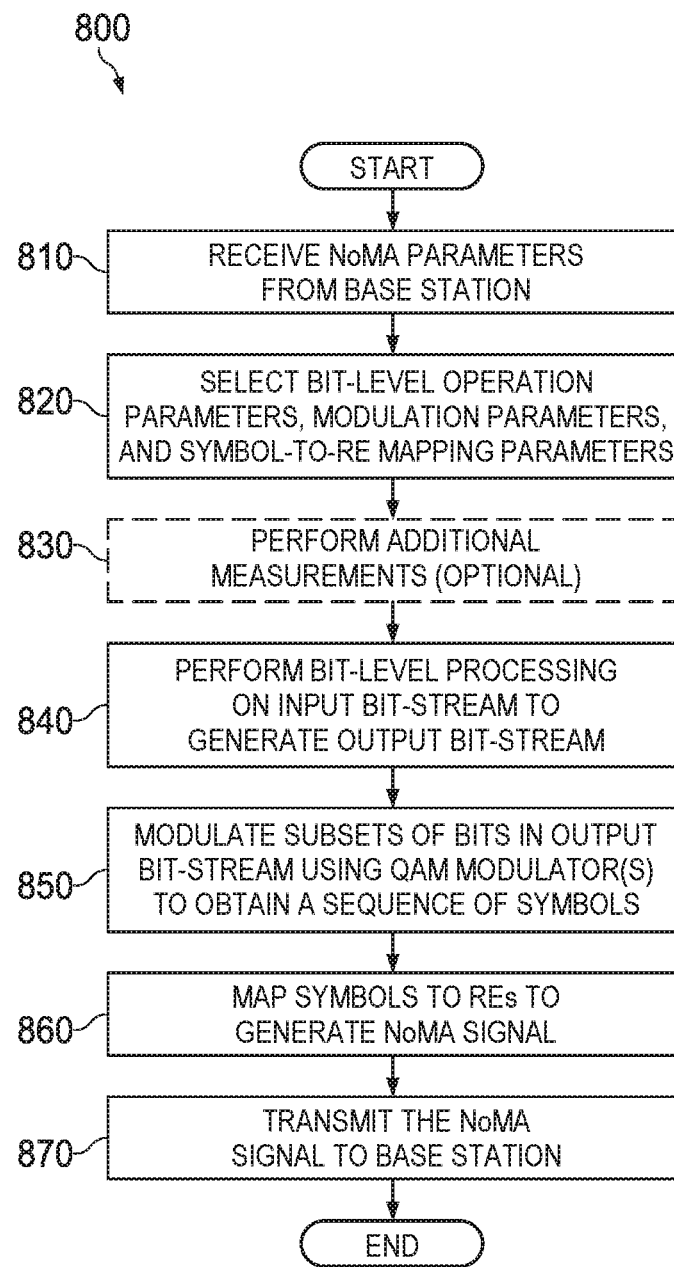
FIG. 8 is a flowchart of an embodiment method for transmitting a NoMA signal.

FIG. 8 is a flowchart of an embodiment method 800 for transmitting a NoMA signal, as might be performed by a UE. At step 810, the UE receives NoMA parameters from a base station. The NoMA parameters could include any parameter used to generate or transmit a NoMA signal, including one of or a combination of two or more of a MA signature, bit-level operation parameters, QAM modulation parameters, symbol-to-RE mapping parameters, resources over which to transmit the NoMA signal, transmit power levels, MCS parameters, receiver capability, traffic load, PAPR requirement, transmission type/mode, application type, TBS, KPI requirement, etc. At step 820, the UE selects bit-level operation parameters, modulation parameters, and/ or symbol-to-RE mapping parameters based on, for example, the NoMA parameters received from the base station, measurements taken by the UE, and/or a priori information. In some embodiments, the UE may take additional measurements at step 830. Such measurements may be instructed by the base station, or otherwise may be associated with a selection made during step 820. At step 840, the UE performs bit-level processing on an input bit-stream to generate an output bit-stream. The bit-level processing includes repetition and bit-level manipulation to achieve symbol spreading in one dimension. At step 850, the UE modulates subsets of bits in the output bit-stream using QAM modulator(s) to obtain a sequence of symbols. At step 860, the UE maps symbols in the sequence of symbols to REs in order to generate a NoMA signal. At step 870, the UE transmits the NoMA signal to the base station. Although the method 800 is described in the context of uplink NoMA transmissions, it should be appreciated that the signaling communicated thereby may also be used to select and/or identify NoMA parameters for receiving downlink NoMA signals by the UE.

In some cases, UE may derive NoMA parameters from other information received from the base station, such as information indicating an MCS level, TBS, spreading factor or related parameter, sparsity level/factor which may be defined as the ratio of non-zero resources utilized for data transmission for a given device over the total available resources, or related parameter, Hybrid Automatic-Repeat-Request (HARQ) and associated parameters, grant-free or grant-based transmission and associated parameters, a number of UEs being served by the base station or related parameters such as the traffic load which refers to the average number of users/streams simultaneously served by the base station (which is also referred to overloading factor). A UE may also select NoMA parameters based on a UE specific identifier, e.g., a radio node temporary identifier (RNTI). A UE may also select NoMA parameters based on an index associated with a demodulation reference signal (DM-RS) pattern. A UE may also randomly select NoMA parameters, e.g., a. NoMA signal is selected randomly based on information carrying bits, and the base station detects the NoMA signal based on an MA signature. Alternatively, a UE may select NoMA parameters based on its own measurements. For example, the UE may select NoMA parameters that provide the highest SINR, and avoid NoMA parameters that provide the lowest SINR. Alternatively, the NoMA parameters may be a priori information to the UE. As yet another alternative, the NoMA parameters may be selected according to a combination of the above-mentioned signaling/selection techniques, e.g., a spreading matrix index may be explicitly signaled and a scrambling index may be derived from an MCS level.

In some embodiments, a UE may send NoMA related feedback to the base station. The feedback information may indicate that the UE used a different NoMA parameter (e.g., different index) than that which was signaled by the base station, such as when the UE selects the NoMA parameters based on its own measurements. The feedback information may also indicate measurement taken by the UE, such as an average, minimum, or maximum SINR for a selected set of NoMA reference signals. The measurements may be reported periodically. Alternatively, the measurements may be reported on-demand based on instructions received from the base station, according to a NoMA transmission (mode) initialization, when a NoMA transmission is configured, or when a UE performs an initialization/power-up procedure. The UE may explicitly signal the index of the NoMA signal used or the offset of the NoMA signal index received from base station side signaling. A base station can obtain information to derive NoMA signal being used from other information reported by UEs of the same base station and/or neighbor base stations or UEs of the neighboring base stations A UE may report to the base station an SINR in the absence of NoMA transmission, which may be used by the base station at network side for deriving the NoMA signal. The SINR report may indicate a best/worst/highest 'n' number or lowest 'm' number of SINR measurements corresponding to the NoMA signal, as well as an MCS level and desired NoMA signal parameters (including the MA signatures, e.g., $i_{1,2}$). Measurements/signaling from neighbor base station/UEs may be used for inter-cell and intra-cell interference mitigation. Cell-edge UEs of neighbor base stations may report the measurements (e.g., SINR) that can be used by the serving base station to avoid severe interference cause by its own cell-edge UEs to the cell-edge UEs of the neighboring cell.

Figure 9A:
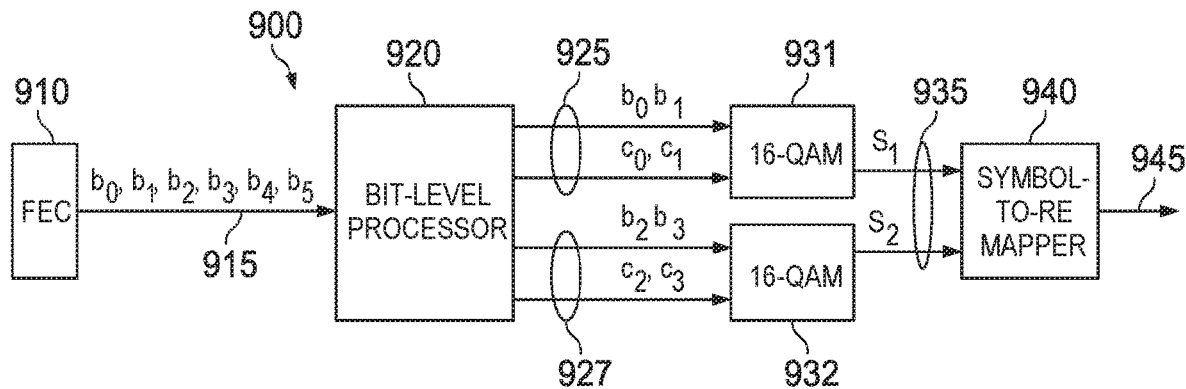
FIG. 9A is a diagram of another embodiment NoMA transmitter that uses a bit-level operation and QAM modulators to generate a NoMA signal.

Bit-level operations may be designed to emulate specific NoMA modulation schemes using various different techniques. FIG. 9A is a diagram of an embodiment transmitter 900 that uses a bit-level operation 920 in conjunction with parallel 16-QAM modulators 931, 932 to generate a NoMA signal 945. As shown, the embodiment transmitter 900 includes an FEC encoder 910, a bit-level processor 920, 16-QAM modulators 931, 932, and a symbol-to-RE mapper 940. In this example, the FEC encoder 910 generates an input bit-stream 915 that includes six bits ($b_0$, $b_1$, $b_2$, $b_3$, $b_4$, $b_5$), and forwards the input bit-stream 915 to the bit-level processor 920, which performs a bit-level operation to generate output bit-streams 925 and 927 which are modulated in parallel by the 16-QAM modulators 931, 932 to generate two symbols, namely $S_1$ and $S_2$ (respectively), that collectively form a sequence of symbols 935. The symbols $S_1$, $S_2$ are then mapped to a set of REs by the symbol-to-RE mapper 940 to obtain a NoMA signal 945, which is transmitted to a receiver, e.g., a UE or base station/NodeB. The output bit-stream 925 contains bits $b_0$, $b_1$, defining the real component of the first 16 QAM symbol, and bits $c_0$, $c_1$, defining the imaginary component of the first 16 QAM symbol. The output bit-stream 927 contains bits $b_2$, $b_3$, defining the real component of the second 16 QAM symbol, and bits $c_2$, $c_3$, defining the imaginary component of the second 16 QAM symbol. Bit-level processor 920 produces bits $c_0$, $c_1$, $c_2$, $c_3$ by performing repetition and then bit-level manipulation of $b_4$, $b_5$ to achieve symbol spreading in one dimension.

Figure 9B:
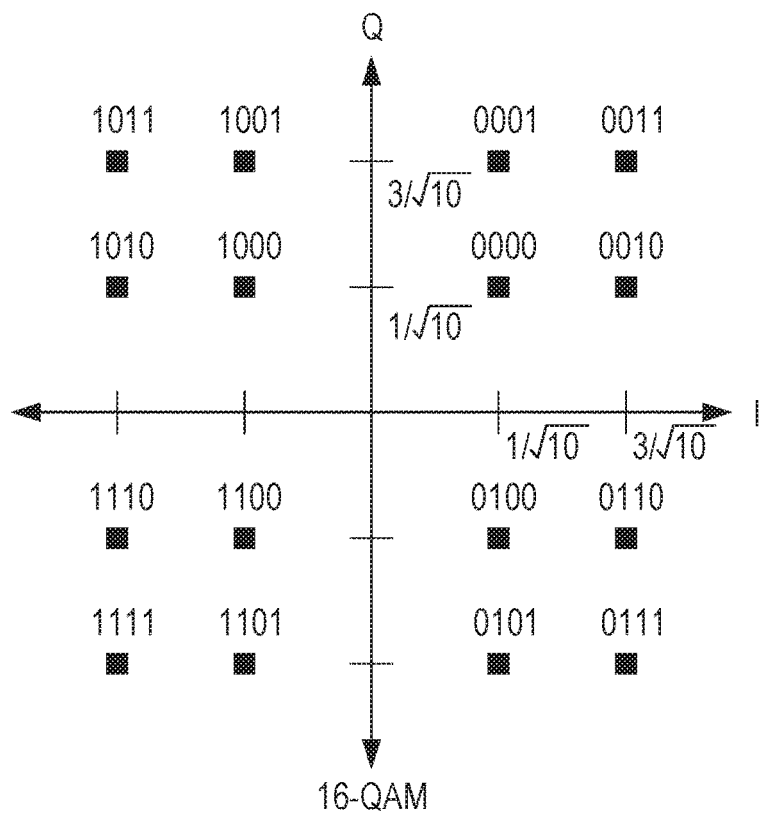
FIG. 9B is an example of a bit mapping to a 16-QAM constellation.

FIG. 9B shows a specific example of how four bits $b_0$, $b_1$ $b_3$, $b_4$ (any four bits—not related to bit splitting above) might be mapped to a 16 QAM constellation. In this example, $b_0$, $b_2$ map to the real dimension (In phase=I), and bits $b_1$, $b_3$ map to the imaginary dimension (quadrature=Q). From the constellation, it is possible to define the bit level manipulations necessary to achieve symbol domain spreading in one dimension.

For bits mapping to the dimension to be spread of a symbol for which the spreading sequence has a value of '1', no change to the bits needs to be made. For bits mapped to the dimension to be spread of a symbol for which the spreading sequence has a value of "−1", the bits need to be switched according to the constellation. For example, if the complex dimension is to be spread, if the symbol in the upper left hand corner (mapped to 1011) is to be spread with "−1" in the imaginary dimension, then the imaginary component needs to be negated, meaning the symbol is mapped to the symbol in the upper lower left hand corner (mapped to 1111). This is achieved by mapping bits $b_1$, $b_3$=01→11. The table below shows the mapping for any combination of bits $b_1$, $b_3$.

| Before | After |
|--------|-------|
| (1 1)  | (0 1) |
| (1 0)  | (0 0) |
| (0 0)  | (1 0) |
| (0 1)  | (1 1) |

Note the same mapping could alternatively be applied to bits $b_0$, $b_2$ to achieve symbol spreading in the real dimension. This can be implemented as a table lookup. Alternatively, this mapping can be implemented with a modulo 2 adder that adds one to the first bit, and a pass through connection that passes the second bit through unmodified. See for example FIG. 9F. In general, the bit level operations can be implemented with a processor that executes software instructions, but alternatively can be implemented with a specific circuit that implements the required logic.

Figure 9C:
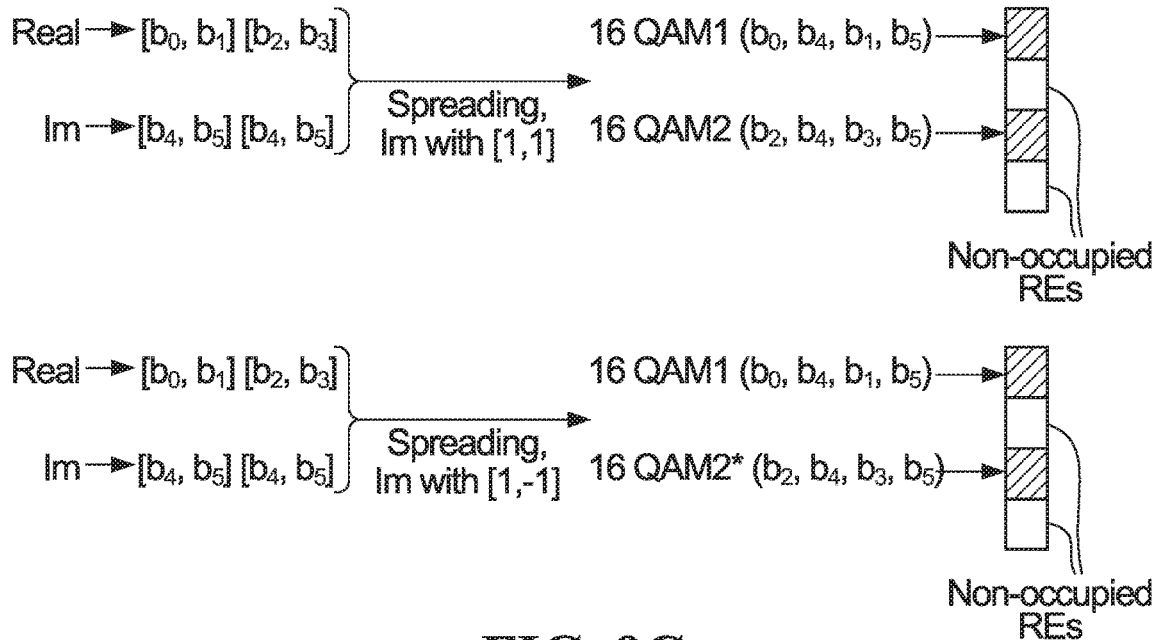
FIG. 9C depicts another specific example of repetition and spreading on one dimension based on an 16 point codebook.

FIG. 9C depicts a specific example of the embodiment of FIG. 9A, where a 64 point codebook is used, meaning 6 input bits map to an output. The input bits $b_0$, $b_1$, $b_2$, $b_3$ map directly to the real components of two 16 QAM symbols.

The input bits $b_4$, $b_5$ are repeated, and then bit-level manipulation is performed to achieve symbol spreading in the imaginary dimension with spreading sequences with (1,1) or (1 −1). For example, the second instance of the bits $b_4$, $b_5$ may be mapped using a lookup table as shown above, or using a specific circuit, such as one including a modulo 2 adder and pass through connection.

For the example of FIGS. 9A and 9C, there are again 12 possible permutations of the spreading sequence and the resource element mapping.

The bit-level operation for the embodiment of FIG. 9A can alternatively be implemented with a lookup table.

In some embodiments, the bit-level processor is configured to adaptively switch between:

performing the bit-level operations described, featuring repetition and spreading in one dimension of a complex modulation scheme, and performing operations that equate with spreading in the symbol domain.

In some embodiments, the bit-level processor is configured to adaptively switch between:

performing the bit-level operations described, featuring repetition and spreading in one dimension of a complex modulation scheme, and performing bit level operations that equate to no spreading being performed.

In some embodiments, the bit-level processor is configured to adaptively switch between:

performing the bit-level operations described, featuring repetition and spreading in one dimension of a complex modulation scheme;

performing operations that equate with spreading in the symbol domain; and performing bit level operations that equate to no spreading being performed.

Figure 9D:
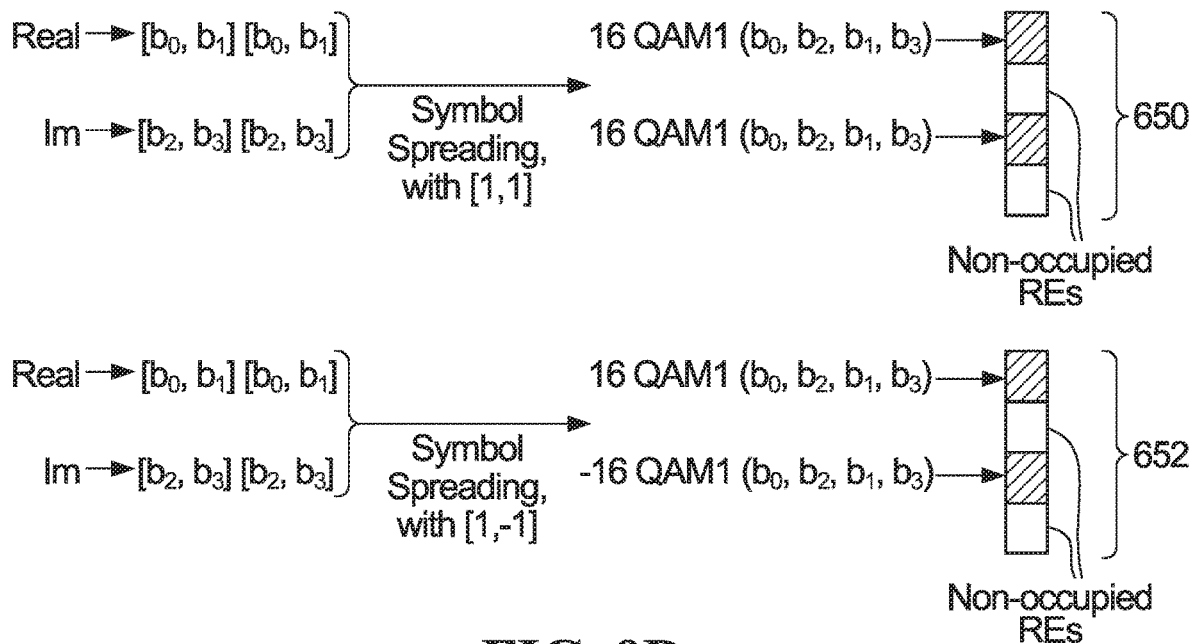
FIG. 9D depicts fall back to spreading in two dimensions of the complex modulator.

FIG. 9D shows an example of bit-level operations that equate to spreading for the case of 16 QAM. In the example generally indicated at 650, there is repetition in both the real and complex dimension, and then both dimensions are spread with the same spreading sequence (1,1). Note this is equivalent to performing spreading in the symbol domain. For the example 652, the same approach is used, with the spreading sequence (1,−1).

Figure 9E:
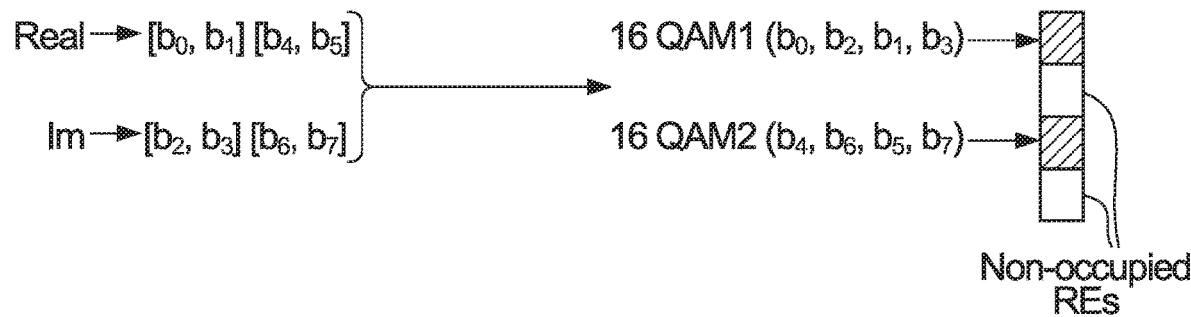
FIG. 9E depicts fall back to non-spreading.
Figure 9F:
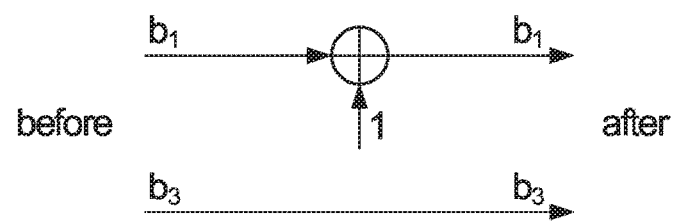
FIG. 9F shows a specific example if bit level manipulation that may be used in spreading in one dimension of a complex modulation scheme.

FIG. 9E shows an example of bit-level operations that equate with no repetition and spreading being performed. While the examples of FIGS. 9C and 9D apply to 16 QAM, the same approach is applicable to other modulation schemes.

Advantageously, it can be seen that the three behaviours in the bit-level operations yield either the described repetition and spreading in one complex dimension, spreading in symbol domain, or no spreading, with no change in the modulation—all the adaptations occur in the bit-level domain.

Figure 10:
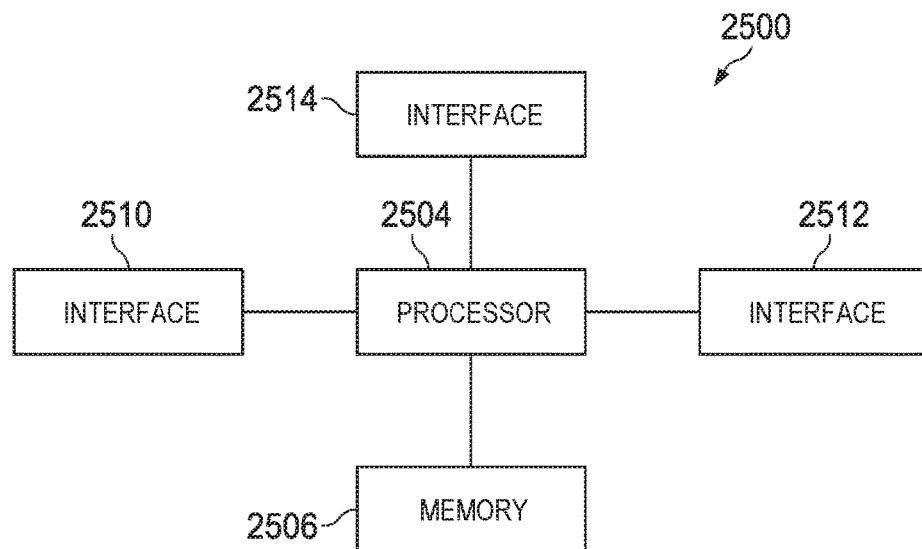
FIG. 10 is a block diagram of an embodiment processing system for performing methods described herein.

FIG. 10 illustrates a block diagram of an embodiment processing system 2500 for performing methods described herein, which may be installed in a host device. As shown, the processing system 2500 includes a processor 2504, a memory 2506, and interfaces 2510-2514. The processor 2504 may be any component or collection of components adapted to perform computations and/or other processing related tasks, and the memory 2506 may be any component or collection of components adapted to store programming and/or instructions for execution by the processor 2504. A means for configuring a context for a UE may include processor 2504. In an embodiment, the memory 2506 includes a non-transitory computer readable medium. The interfaces 2510, 2512, 2514 may be any component or collection of components that allow the processing system 2500 to communicate with other devices/components and/or a user. For example, one or more of the interfaces 2510, 2512, 2514 may be adapted to communicate data, control, or management messages from the processor 2504 to applications installed on the host device and/or a remote device. As another example, one or more of the interfaces 2510, 2512, 2514 may be adapted to allow a user or user device (e.g., personal computer (PC), etc.) to interact/communicate with the processing system 2500. The processing system 2500 may include additional components not depicted in FIG. 25, such as long term storage (e.g., non-volatile memory, etc.).

In some embodiments, the processing system 2500 is included in a network device that is accessing, or part otherwise of, a telecommunications network. In one example, the processing system 2500 is in a network-side device in a wireless or wireline telecommunications network, such as a base station, a relay station, a scheduler, a controller, a gateway, a router, an applications server, or any other device in the telecommunications network. In other embodiments, the processing system 2500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
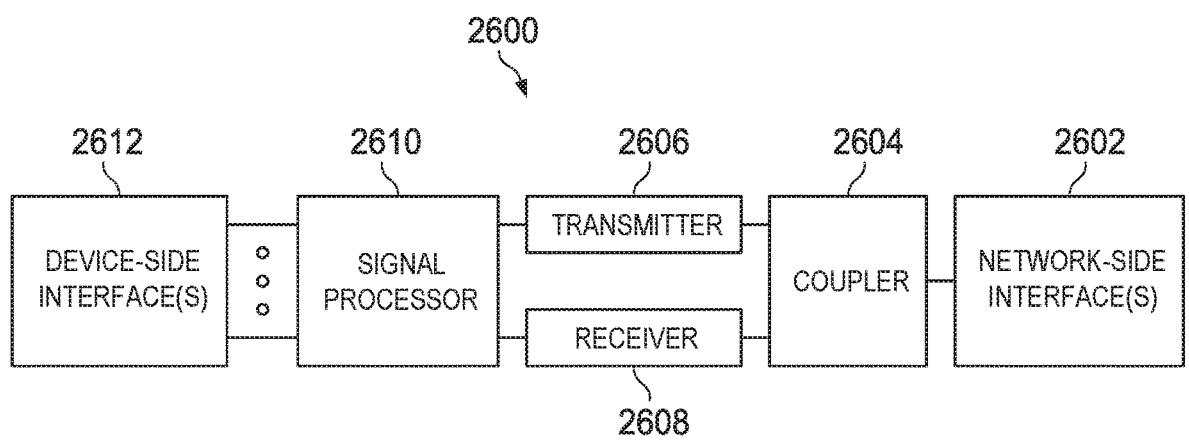
FIG. 11 is a block diagram of a transceiver adapted to transmit and receive signaling over a telecommunications network according to example embodiments described herein.

In some embodiments, one or more of the interfaces 2510, 2512, 2514 connects the processing system 2500 to a transceiver adapted to transmit and receive signaling over the telecommunications network. FIG. 11 illustrates a block diagram of a transceiver 2600 adapted to transmit and receive signaling over a telecommunications network. The transceiver 2600 may be installed in a host device. As shown, the transceiver 2600 comprises a network-side interface 2602, a coupler 2604, a transmitter 2606, a receiver 2608, a signal processor 2610, and a device-side interface 2612. The network-side interface 2602 may include any component or collection of components adapted to transmit or receive signaling over a wireless or wireline telecommunications network. The network-side interface 2602 may also include any component or collection of components adapted to transmit or receive signaling over a short-range interface. The network-side interface 2602 may also include any component or collection of components adapted to transmit or receive signaling over a Uu interface. The coupler 2604 may include any component or collection of components adapted to facilitate bi-directional communication over the network-side interface 2602. The transmitter 2606 may include any component or collection of components (e.g., up-converter, power amplifier, etc.) adapted to convert a baseband signal into a modulated carrier signal suitable for transmission over the network-side interface 2602. A means for transmitting an initial message of an access procedure may include transmitter 2606. The receiver 2608 may include any component or collection of components (e.g., down-converter, low noise amplifier, etc.) adapted to convert a carrier signal received over the network-side interface 2602 into a baseband signal. A means for receiving mobile subscriber identifiers, initial downlink messages of access procedures, and forwarded requests to connect to a network may include receiver 2608.

The signal processor 2610 may include any component or collection of components adapted to convert a baseband signal into a data signal suitable for communication over the device-side interface(s) 2612, or vice-versa. The device-side interface(s) 2612 may include any component or collection of components adapted to communicate data-signals between the signal processor 2610 and components within the host device (e.g., the processing system 2500, local area network (LAN) ports, etc.).

The transceiver 2600 may transmit and receive signaling over any type of communications medium. In some embodiments, the transceiver 2600 transmits and receives signaling over a wireless medium. For example, the transceiver 2600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 2602 comprises one or more antenna/radiating elements. For example, the network-side interface 2602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method for using a bit-level operation to enable non-orthogonal multiple access (NoMA) communication using a standard modulator, the method comprising:
    generating, by a transmitter, an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of bits of the input bit-stream by repetition and bit-level manipulation to achieve symbol spreading in one dimension of a complex modulation scheme, the input bit-stream being an error-detection/correction encoded bit-stream;
    modulating, by the transmitter, the output bit-stream in accordance with the standard modulator to obtain a sequence of symbols in the complex modulation scheme having a real dimension and an imaginary dimension, each symbol having a real component in the real dimension and an imaginary component in the imaginary dimension, wherein bits from the first subset of output bits are used by the modulator to define a first component of each symbol of the sequence of symbols, and bits from the second subset of output bits are used by the modulator to define a second component of each symbol of the sequence of symbols, wherein the first component is the real component and the second component is the imaginary component, or the first component is the imaginary component and the second component is the real component;
mapping, by the transmitter, the sequence of symbols to resource elements to obtain a NoMA signal; and
transmitting the NoMA signal to a receiver.

2. The method of claim 1, wherein a spreading sequence applied in the symbol spreading in combination with a symbol-to-resource element mapping applied in said mapping correspond to a particular multiple access signature.

3. The method of claim 1, further comprising encoding, by a forward error correction (FEC) encoder, an unmodified input bit-stream to generate the error-detection/correction coded input bit-stream.

4. The method of claim 1, wherein transmitting the NoMA signal to a receiver comprises transmitting the NoMA signal from a base station to a UE, or transmitting the NoMA signal from a UE to a base station.

5. The method of claim 1, wherein different NoMA signals are transmitted to or by the same UE.

6. The method of claim 1, wherein different NoMA signals are transmitted to or by different UEs.

7. The method of claim 1, wherein transmitting the NoMA signal to a receiver comprises transmitting the NoMA signal from a UE to a base station, the method further comprising:
the UE receiving an indication of a multiple access (MA) signature, the MA signature configuring the UE to use a specific bit-level operation and resource element mapping to distinguish the UE's uplink transmission from other UEs' uplink transmissions.

8. The method of claim 1, wherein transmitting the NoMA to a receiver comprises transmitting the NoMA signal from a base station to a UE, the method further comprising the base station transmitting an indication of a multiple access (MA) signature to the UE, the MA signature configuring the UE to use a specific bit-level operation and resource element mapping to decode a downlink NoMA transmission.

9. The method of claim 1 further comprising adaptively adjusting the bit-level operation between:
performing said repetition and spreading for bits defining one dimension of the complex modulation scheme; and
performing operations that equate with spreading in the symbol domain.

10. The method of claim 1 further comprising adaptively adjusting the bit-level operation between:
performing said repetition and spreading for bits defining one dimension of the complex modulation scheme; and
performing bit level operations that equate to no spreading being performed.

11. The method of claim 1 further comprising adaptively adjusting the bit-level operation between:
performing said repetition and spreading for bits defining one dimension of complex modulation scheme;
performing operations that equate with spreading in the symbol domain; and
performing bit level operations that equate to no spreading being performed.

12. The method of claim 10 further comprising:
transmitting signaling indicating which bit-level operation to perform when receiving the NoMA signal.

13. An apparatus comprising:
a processor; and
a non-transitory computer readable storage medium storing programming for execution by the processor, the programming including instructions to:
generate an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of bits of the input bit-stream by repetition and bit-level manipulation to achieve symbol spreading in one dimension of complex modulation scheme, the input bit-stream being an error-detection/correction encoded bit-stream;
modulate, the output bit-stream in accordance with the standard modulator to obtain a sequence of symbols in the complex modulation scheme having a real dimension and an imaginary dimension, each symbol having a real component in the real dimension and a imaginary component in the imaginary dimension, wherein bits from the first subset of output bits define a first component of each symbol of the sequence of symbols, and bits from the second subset of output bits are define a second component of each symbol of the sequence of symbols, wherein the first component is the real component and the second component is the imaginary component, or the first component is the imaginary component and the second component is the real component;
map the sequence of symbols to resource elements to obtain a NoMA signal; and
transmit the NoMA signal to a receiver.

14. The apparatus of claim 13 wherein a spreading sequence applied in the symbol spreading in combination with a symbol-to-resource element mapping applied in said mapping correspond to a particular multiple access signature.

15. An apparatus comprising:
a bit level processor configured to generate an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of bits of the input bit-stream by repetition and bit-level manipulation to achieve symbol spreading in one dimension of complex modulation scheme, the input bit-stream being an error-detection/correction encoded bit-stream;
a modulator connected to modulate the output bit-stream in accordance with a standard modulation scheme to obtain a sequence of symbols in the complex modulation scheme having a real dimension and an imaginary dimension, each symbol having a real component in the real dimension and an imaginary component in the imaginary dimension, wherein bits from the first subset of output bits are used by the modulator to define a first component of each symbol of the sequence of symbols, and bits from the second subset of output bits are used by the modulator to define a second component of each symbol of the sequence of symbols, wherein the first component is the real component and the second component is the imaginary component, or the first component is the imaginary component and the second component is the real component;
a symbol-to-resource element mapper configured to map the sequence of symbols to resource elements to obtain a NoMA signal; and
a transmitter configured to transmit the NoMA signal to a receiver.

16. The apparatus of claim 15, wherein a spreading sequence applied in the spreading in combination with a symbol-to-resource element mapping applied in said mapping correspond to a particular multiple access signature.

17. The apparatus of claim 15, further comprising:
a forward error correction (FEC) encoder configured to encode an unmodified input bit-stream to generate the error-detection/correction coded input bit-stream.

18. The apparatus of claim 15, wherein different NoMA signals are transmitted to or by the same UE.

19. The apparatus of claim 15, wherein different NoMA signals are transmitted to or by different UEs.

20. The apparatus of claim 15 further configured to adaptively adjust the bit-level operation between:
performing said repetition and spreading for bits defining one dimension of the complex modulation scheme; and
performing operations that equate with spreading in the symbol domain.

21. The apparatus of claim 15 further configured to adaptively adjust the bit-level operation between:
performing said repetition and spreading for bits defining one dimension of the complex modulation scheme; and
performing bit level operations that equate to no spreading being performed.

22. The apparatus of claim 15 further configured to adaptively adjust the bit-level operation between:
performing said repetition and spreading for bits defining one dimension of complex modulation scheme;
performing operations that equate with spreading in the symbol domain; and
performing bit level operations that equate to no spreading being performed.

23. The apparatus of claim 20 further configured to transmit signaling indicating which bit-level operation to perform when receiving the NoMA signal.

24. The apparatus of claim 15, comprising:
a base station, wherein the bit level process, modulator, symbol-to-resource element mapper, and transmitter are parts of the base station;
wherein the transmitter is configured to transmit the NoMA signal to a receiver by transmitting the NoMA signal to a UE.

25. The apparatus of claim 24 further configured to transmit an indication of a multiple access (MA) signature to the UE, the MA signature configuring the UE to use a specific bit-level operation and resource element mapping to decode a downlink NoMA transmission.

26. The apparatus of claim 15, comprising
a UE, wherein the bit level process, modulator, symbol-to-resource element mapper, and transmitter are parts of the UE;
wherein the transmitter is configured to transmit the NoMA signal to a receiver by transmitting the NoMA signal to a base station.

27. The apparatus of claim 26, further configured to receive an indication of a multiple access (MA) signature, the MA signature configuring the UE to use a specific bit-level operation and resource element mapping to distinguish the UE's uplink transmission from other UEs' uplink transmissions.

28. A computer program product comprising a non-transitory computer readable storage medium storing programming, the programming including instructions to:
generate an output bit-stream from an input bit-stream in accordance with a bit-level operation on the input bit-stream, the output bit stream comprising first and second subsets of output bits, the first subset of the output bits equaling a first subset of bits of the input bit-stream, and the second subset of output bits being produced from a second subset of bits of the input bit-stream by repetition and bit-level manipulation to achieve symbol spreading in one dimension of complex modulation scheme, the input bit-stream being an error-detection/correction encoded bit-stream;
modulate the output bit-stream in accordance with a standard modulator to obtain a sequence of symbols, in the complex modulation scheme having a real dimension and an imaginary dimension, each symbol having a real component in the real dimension and an imaginary component in the imaginary dimension, wherein bits from the first subset of output bits are used by the modulator to define a first component of each symbol of the sequence of symbols, and bits from the second subset of output bits are used by the modulator to define a second component of each symbol of the sequence of symbols, wherein the first component is the real component and the second component is the imaginary component, or the first component is the imaginary component and the second component is the real component;
map the sequence of symbols to resource elements to obtain a NoMA signal; and
transmit the NoMA signal to a receiver.

29. The computer program product of claim 28, wherein a spreading sequence applied in the spreading in combination with a symbol-to-resource element mapping applied in said mapping correspond to a particular multiple access signature.

30. The computer program product of claim 28, the instructions further comprising encoding, by a forward error correction (FEC) encoder, an unmodified input bit-stream to generate the error-detection/correction coded input bit-stream.

31. The computer program product of claim 28, wherein transmitting the NoMA signal to a receiver comprises transmitting the NoMA signal from a base station to a UE, or transmitting the NoMA signal from a UE to a base station.

32. The computer program product of claim 28, wherein different NoMA signals are transmitted to or by the same UE.

33. The computer program product of claim 28, wherein different NoMA signals are transmitted to or by different UEs.

34. The computer program product of claim 28, wherein transmitting the NoMA signal to a receiver comprises transmitting the NoMA signal from a UE to a base station, the computer program product further comprising:
the UE receiving an indication of a multiple access (MA) signature, the MA signature configuring the UE to use a specific bit-level operation and resource element mapping to distinguish the UE's uplink transmission from other UEs' uplink transmissions.

35. The computer program product of claim 28, wherein transmitting the NoMA signal to a receiver comprises transmitting the NoMA signal from a base station to a UE, the instructions further comprising the base station transmitting an indication of a multiple access (MA) signature to the UE, the MA signature configuring the UE to use a specific bit-level operation and resource element mapping to decode a downlink NoMA transmission.

36. The computer program product of claim 28 the instructions further comprising adaptively adjusting the bit-level operation between:
performing said repetition and spreading for bits defining one dimension of the complex modulation scheme; and performing operations that equate with spreading in the symbol domain.

37. The computer program product of claim 28 the instructions further comprising adaptively adjusting the bit-level operation between:
performing said repetition and spreading for bits defining one dimension of the complex modulation scheme; and
performing bit level operations that equate to no spreading being performed.

38. The computer program product of claim 28 the instructions further comprising adaptively adjusting the bit-level operation between:
performing said repetition and spreading for bits defining one dimension of complex modulation scheme;
performing operations that equate with spreading in the symbol domain; and
performing bit level operations that equate to no spreading being performed.

39. The computer program product of claim 36, the instructions further comprising:
transmitting signaling indicating which bit-level operation to perform when receiving the NoMA signal.

* * * * *